United States Patent
Durrant et al.

(10) Patent No.: US 6,955,478 B2
(45) Date of Patent: Oct. 18, 2005

(54) STUB HAVING AN OPTICAL FIBER

(75) Inventors: Richard C. E. Durrant, Suffolk (GB); Aleksandr Lantsman, Wheeling, IL (US); David G. Mead, Naperville, IL (US); Christopher M. Warnes, Suffolk (GB); Theodore Washburn, Barrington, IL (US)

(73) Assignee: Stratos International, Inc., Chicago, IL (US)

( * ) Notice: Subject to any disclaimer, the term of this patent is extended or adjusted under 35 U.S.C. 154(b) by 36 days.

(21) Appl. No.: 10/884,225

(22) Filed: Jul. 2, 2004

(65) Prior Publication Data

US 2004/0240795 A1 Dec. 2, 2004

Related U.S. Application Data

(62) Division of application No. 10/151,362, filed on May 20, 2002, now Pat. No. 6,805,491.

(51) Int. Cl.[7] .................................................. G02B 6/36
(52) U.S. Cl. ............................. 385/76; 385/77; 385/78; 385/80; 385/139
(58) Field of Search ........................... 385/76, 77, 78, 385/80, 139

(56) References Cited

U.S. PATENT DOCUMENTS

| | | | |
|---|---|---|---|
| 3,910,677 A | 10/1975 | Becker et al. .................. 350/96 |
| 4,300,813 A | 11/1981 | Gravel ........................ 350/96.1 |
| 4,710,605 A | 12/1987 | Presby ........................ 219/121 |
| 4,932,989 A | 6/1990 | Presby ............................. 65/2 |
| 4,964,688 A | * 10/1990 | Caldwell et al. ............... 385/56 |
| 5,011,254 A | 4/1991 | Edwards et al. ........... 350/96.18 |
| 5,061,342 A | 10/1991 | Jones ......................... 156/643 |
| 5,256,851 A | 10/1993 | Presby .................... 219/121.6 |
| 5,501,385 A | 3/1996 | Halpin .......................... 225/96 |
| 5,568,581 A | 10/1996 | Johnson et al. ............... 385/78 |
| 5,598,493 A | 1/1997 | Bonham et al. ............... 385/33 |
| 5,631,986 A | 5/1997 | Frey et al. .................... 385/78 |
| 5,800,666 A | 9/1998 | Bonham, Jr. et al. ....... 156/345 |
| 5,909,528 A | 6/1999 | Tamekuni et al. ........... 385/137 |
| 5,940,557 A | 8/1999 | Harker ......................... 385/33 |
| 6,139,196 A | 10/2000 | Feth et al. .................... 385/97 |
| 6,246,026 B1 | 6/2001 | Vergeest ................ 219/121.72 |
| 6,599,029 B2 | * 7/2003 | Yamazaki et al. ............. 385/80 |

FOREIGN PATENT DOCUMENTS

JP          09152524 A       6/1997      ............ G02B/6/36

* cited by examiner

*Primary Examiner*—Dean A. Reichard
*Assistant Examiner*—Jinhee Lee
(74) *Attorney, Agent, or Firm*—Karl D. Kovach

(57) ABSTRACT

A device includes a stub, and an optical fiber. The stub has an aperture, and a first end and a second end. The optical fiber is mounted in the aperture of the stub. The optical fiber has a first end and a second end. The first end of the optical fiber is polished so as to be flush with the first end of the stub. The second end of the optical fiber is cleaved at a predetermined position so as to provide for a predetermined length of the optical fiber measured from the first end of the optical fiber to the second end of the optical fiber.

7 Claims, 5 Drawing Sheets

STUB HAVING AN OPTICAL FIBER

This is a division of U.S. patent application Ser. No. 10/151,362, filed May 20, 2002 now U.S. Pat. No. 6,805,491, which is hereby incorporated herein by reference.

BACKGROUND OF THE INVENTION

1. Field of the Invention

The present invention pertains to the field of fiber optics. The invention more particularly concerns an optical fiber mounted in a stub where one end of the optical fiber is cleaved and the other end of the optical fiber is polished. Glass material is used to construct the optical fiber or waveguide.

2. Discussion of the Background

Cleaving an optical fiber by mechanical means is known in the art and cleaving with a laser or cutting beam is also known in the art and is disclosed in U.S. Pat. Nos. 4,710,605, and 6,139,196. U.S. Pat. Nos. 4,710,605, and 6,139,196 are hereby incorporated herein by reference. U.S. Pat. No. 4,710,605 discloses a single optical fiber mounted in a fixture where the laser cleaves a bare optical fiber. U.S. Pat. No. 6,139,196 discloses a single optical fiber, including a fiber jacket surrounding the optical fiber, mounted in a fixture where the laser cleaves the fiber jacket and the optical fiber. In both cases, the cleaved optical fibers are then removed from their respective fixtures for further processing.

Additionally, forming a lens at an end of an optical fiber with a laser is known in the art and is disclosed in U.S. Pat. Nos. 4,932,989; 5,011,254; and 5,256,851. U.S. Pat. Nos. 4,932,989; 5,011,254; and 5,256,851 are hereby incorporated herein by reference. U.S. Pat. No. 4,932,989 discloses a single optical fiber mounted in a fixture, where the optical fiber has a tapered lens formed at an end of the optical fiber with a laser. U.S. Pat. No. 5,011,254 discloses a single optical fiber mounted in a fixture, where the optical fiber has a hyperbolic lens formed at an end of the optical fiber with a laser. U.S. Pat. No. 5,256,851 discloses a single optical fiber mounted in a fixture, where the optical fiber has an asymmetric hyperbolic lens formed at an end of the optical fiber with a laser. In all three cases, the cleaved and lensed optical fibers are then removed from their respective fixtures for further processing.

Typically, the cleaved and lensed optical fiber is mounted in a housing which contains either an optoelectronic transmitter or an optoelectronic receiver. In the case of the optoelectronic transmitter, the optoelectronic transmitter emits a light signal which shines on the lens of the optical fiber where the light signal is efficiently introduced into the optical fiber. In the case of the optoelectronic receiver, a light signal propagates along a length of the optical fiber and exits the optical fiber, thus focusing the light signal, in an efficient manner, on the optoelectronic receiver.

Both the cleaving step and the lensing step of the prior art require numerous time consuming set-up operations, low yields, and result in difficulty in handling and placing the optical fiber in an assembly.

SUMMARY OF THE INVENTION

Therefore, it is an object of the invention to provide a device which is easily assembled into other structures or housings.

It is another object of the present invention to provide a terminated optical fiber which includes a stub attached to the optical fiber which provides for shorter set-up times and thus increased productivity.

It is yet another object of the present invention to provide a cleaved and lensed optical fiber which is robust and rugged enough not to be damaged by a vibrating feeding machine which is part of an assembly line process to feed the device to another structure for assembly.

In one form of the invention, the device includes a stub, and an optical fiber, the stub having an aperture, and a first end and a second end. The optical fiber is mounted in the aperture of the stub. The optical fiber has a first end and a second end. The first end of the optical fiber is polished so as to be flush with the first end of the stub. The polished end is in conformity with the physical contact surface finish standard. The second end of the optical fiber is terminated at a predetermined position so as to provide for a predetermined length of the optical fiber measured from the first end of the optical fiber to the second end of the optical fiber.

In yet another form of the invention, the device includes a stub, an adhesive material, and an optical fiber, the stub having an aperture, and a first end and a second end. The optical fiber is attached to the aperture of the stub by way of the adhesive material. The optical fiber has a first end and a second end. The first end of the optical fiber is polished so as to be flush with the first end of the stub. The polished end is in conformity with the physical contact surface finish standard. The second end of the optical fiber is cleaved at a predetermined position so as to provide for a predetermined length of the optical fiber measured from the first end of the optical fiber to the second end of the optical fiber.

In still yet another form of the invention, a method is set forth for producing the first above-described device. The method includes the steps of selecting a stub having an aperture; inserting the optical fiber into the aperture of the stub; polishing a first end of the stub and a first end of the optical fiber so as to form a physical contact surface finish; and terminating the optical fiber so as to form a second end of the optical fiber.

In another form of the invention, a method is set forth for producing the second above-described device. The method includes the steps of selecting a stub having an aperture; applying an adhesive material to at least one of the aperture of the stub and optical fiber; inserting the optical fiber into the aperture of the stub so as to affix the optical fiber to the stub by way of the adhesive material; polishing a first end of the stub and a first end of the optical fiber so as to form a physical contact surface finish; and cleaving the optical fiber so as to form a second end of the optical fiber.

Thus, the device of the invention is superior to existing solutions since the stub having the optical fiber is connectorized. The device can be assembled in large quantities and stored. The device can be assembled into a housing containing an optoelectronic device or it can be assembled onto a board which has unfinished or un-connectorized optical fiber which need to be terminated. Thus, the device of the invention is more cost effective than prior art devices.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 1:
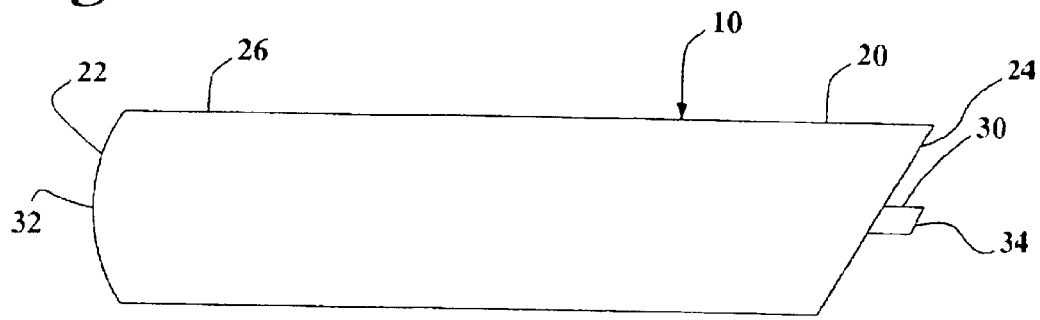
FIG. 1 is a plan view of the device including the stub and the optical fiber.
Figure 2:
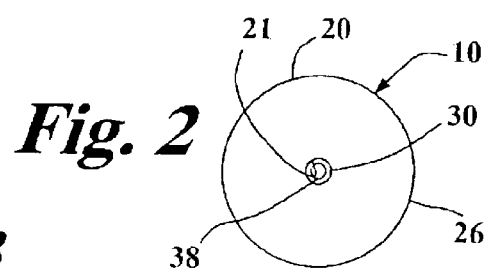
FIG. 2 is a plan view of an end of the device of FIG. 1.
Figure 3:
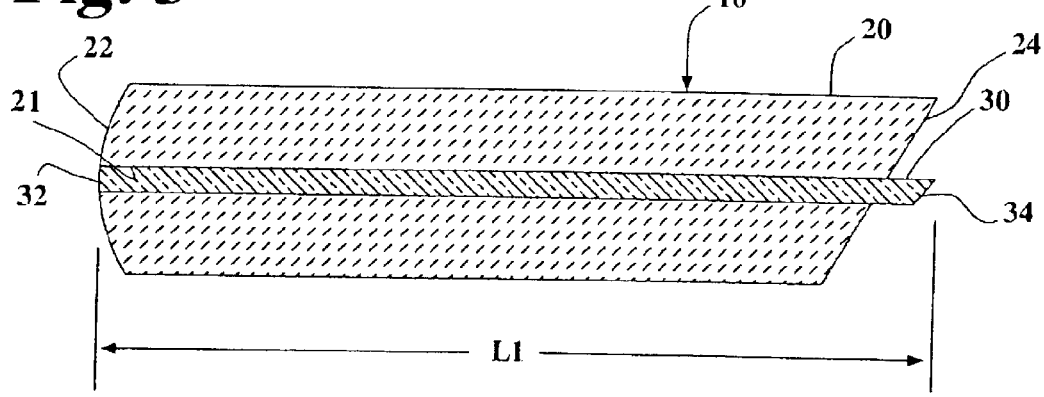
FIG. 3 is a cross-sectional view of the device of FIG. 1.

Referring now to the drawings, wherein like reference numerals designate identical or corresponding parts throughout the several views, and more particularly to FIGS. 1–3 thereof, is a device 10 including a stub 20 and an optical fiber 30.

FIG. 1 is a plan view of the device 10 which includes the stub 20, and the optical fiber 30. The stub 20 includes a first end 22, and a second end 24. The optical fiber 30 includes a first end 32, and a second end 34.

FIG. 2 is a plan view of an end of the device 10 showing the profile of the cylindrically shaped surface 26 of the stub 20. Also shown is the aperture 21 of the stub 20.

FIG. 3 is a cross-sectional view of the device 10 of FIG. 1. The first end 32 of the optical fiber 30 is polished so as to be flush with the first end 22 of the stub 20. The first end 22 of the stub 20 and the first end 32 of the optical fiber 30 are polished so as to be in conformity with the physical contact (PC) surface finish standard so as to allow the device 10 to mate with an optical connector (not shown). The second end 34 of the optical fiber 30 extends past the second end 24 of the stub. The second end 34 of the optical fiber 30 may be at any angle including angles other than ninety degrees relative to the length of the optical fiber 30 as shown in FIG. 3, however, it is typically cut at an angle of six to ten degrees from a direction perpendicular to the length of the optical fiber 30. The second end 34 of the optical fiber 30 extends beyond the second end 24 of the stub 20 by approximately three hundred microns and as such the cantilevered portion of the optical fiber 30 is relatively stiff and essentially does not bend or flex. The overall length L1 of the device is approximately one-half inch. The second end 24 of the stub 20 can be cut at any angle, however, it is typically cut at an angle of six to ten degrees from a direction perpendicular to the length of the stub 20.

Initially, a stub 20 is selected which includes an appropriate aperture 21. The size of the aperture 21 of the stub 20 is based on the size of the optical fiber 30. Typically, the diameter of the aperture 21 is greater than the diameter of the optical fiber 30. During assembly, an optical fiber 30 has an adhesive material 38 (for reasons of clarity the adhesive material 38 is not shown in FIGS. 3, 4, and 6) applied to its outer surface. The optical fiber 30, along with the adhesive material 38, is introduced into the aperture 21 of the stub 20. At that time, portions of the optical fiber 30 protrude beyond the first and second ends 22, 24 of the stub 20. The adhesive material 38 secures the optical fiber 30 to the stub 20. Typically, the adhesive material 38 is an epoxy material. The first end 32 of the optical fiber 30 and the first end 22 of the stub 20 are polished as described above. The polishing creates a surface which conforms to the physical contact standard and may be one of many standard shapes, such as SC, LC, and etc. The physical contact standard requires that the first surface 32 of the optical fiber 30 contact the optical fiber of the associated connector (not shown). The physical contact eliminates air gaps between the surfaces which contribute to insertion losses.

The length L1 of the optical fiber 30 and hence the device 10 is predetermined. Thus, after the first ends 22, 32 are polished the exact location for cutting the optical fiber 30 at the second end 34 can be determined to achieve the overall length L1. Once the location of the second end 34 of the optical fiber is determined a cleaving step is employed to perform the cut. The cleaving step can be performed mechanically or by lasing.

Mechanical cleaving consists of scoring the surface of the optical fiber 30 with a diamond or sapphire tipped tool so as to create a crack on the surface of the optical fiber 30 at the location of the second end 34. The optical fiber 30 is then stressed, typically by bending, so as to propagate the crack across the diameter of the optical fiber 30.

Laser cleaving consists of ablating a portion of the optical fiber 30 at the designated position. The laser does not harm the stub 20 material. The stub 20 is typically made of a ceramic material. However, the stub 20 can be made of a polymer material or a metallic material.

Compared to polishing, the cleaving process is quick and accurate, and increases yields, and the length L1 can be controlled.

Figure 4:
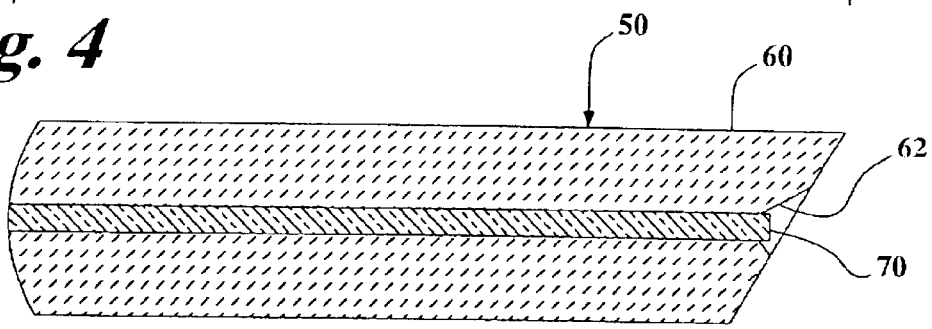
FIG. 4 is a cross-sectional view of another embodiment of the device.

FIG. 4 is a side view of another embodiment of the device 50 including a stub 60, which is similar to the stub 20, and an optical fiber 70. The second end of the optical fiber 70 is under flush with the surface of the stub 60. The stub 60 includes a recess 62 which enables the laser or cutting beam to cut the optical fiber 70 below the surface of the stub 60.

Figure 5:
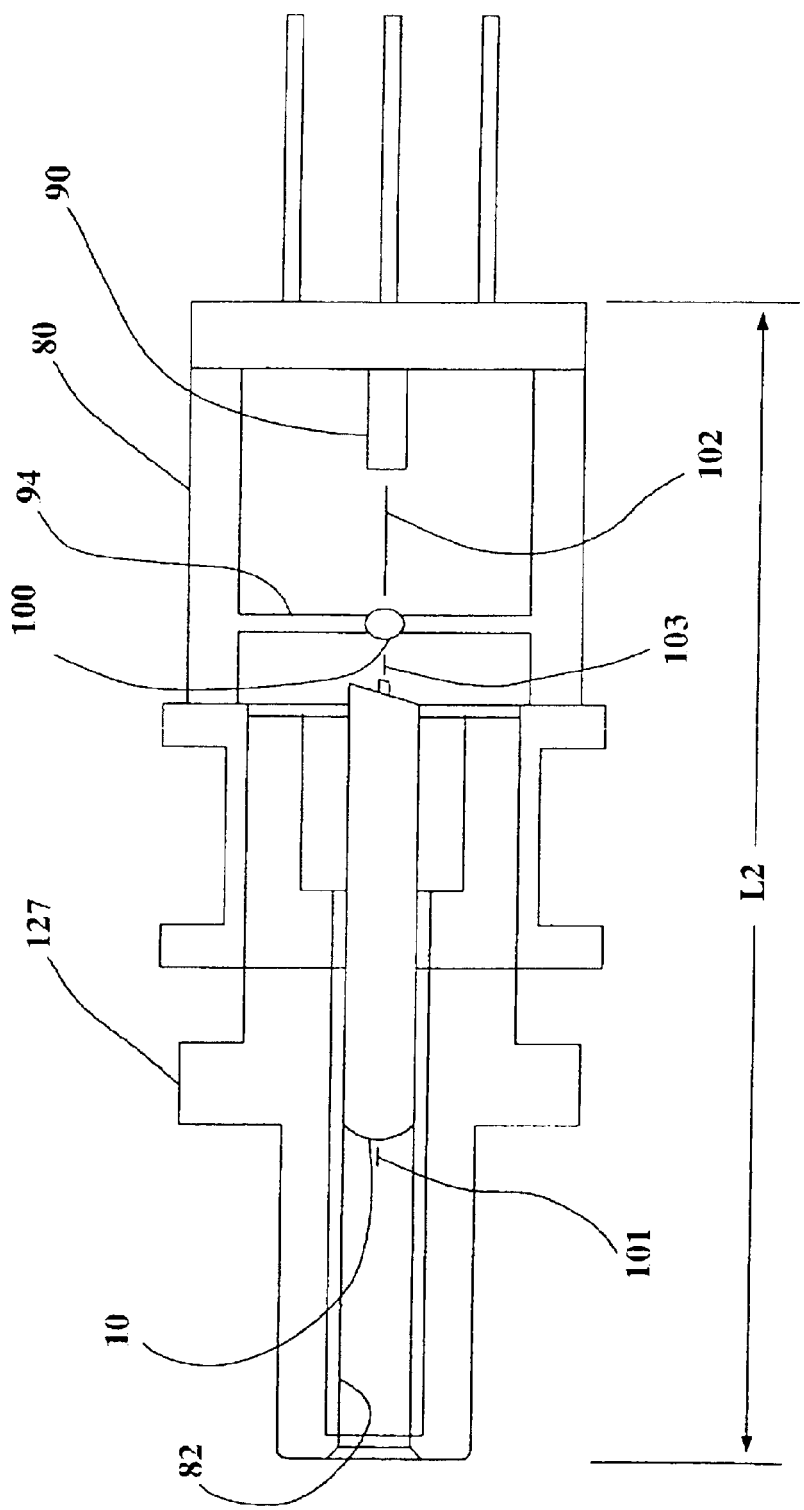
FIG. 5 is a cross-sectional view of the device of FIG. 4 mounted in a housing along with an optoelectronic device and a separate focusing lens.

FIG. 5 is a partial cross-sectional view of an assembly 80 including an optoelectronic device 90, a can or lid 94, a focusing element 100, such as a spherical ball lens, a housing 127, and the device 10. The assembly has an overall length denoted by L2. The assembly 80 includes a ferrule receiving bore 82 for receiving a ferrule of an optical connector which physically contacts the device 10. The optoelectronic device 80 and the device 10 (including the stub 20 and the optical fiber 30) are attached to the housing 127. If the optoelectronic device 90 is a transmitter, optical energy flows out of the optoelectronic device 90 and flows into the focusing element 100 along optical axis 102. The focusing element 100 focuses the optical energy on the cleaved end of the optical fiber of the device 10 along the optical axis 103. The optical energy then flows through the optical fiber of the device 10 and then enters the optical connector at the first end of the device 10 along optical axis 101. If the optoelectronic device is a receiver, then the process described above is reversed. The flow of energy into or out of the optoelectronic device occurs through an optically active portion of the optoelectronic device. The cap or lid 94 hermetically seals the optoelectronic device 90 away from harmful environmental conditions.

Figure 6:
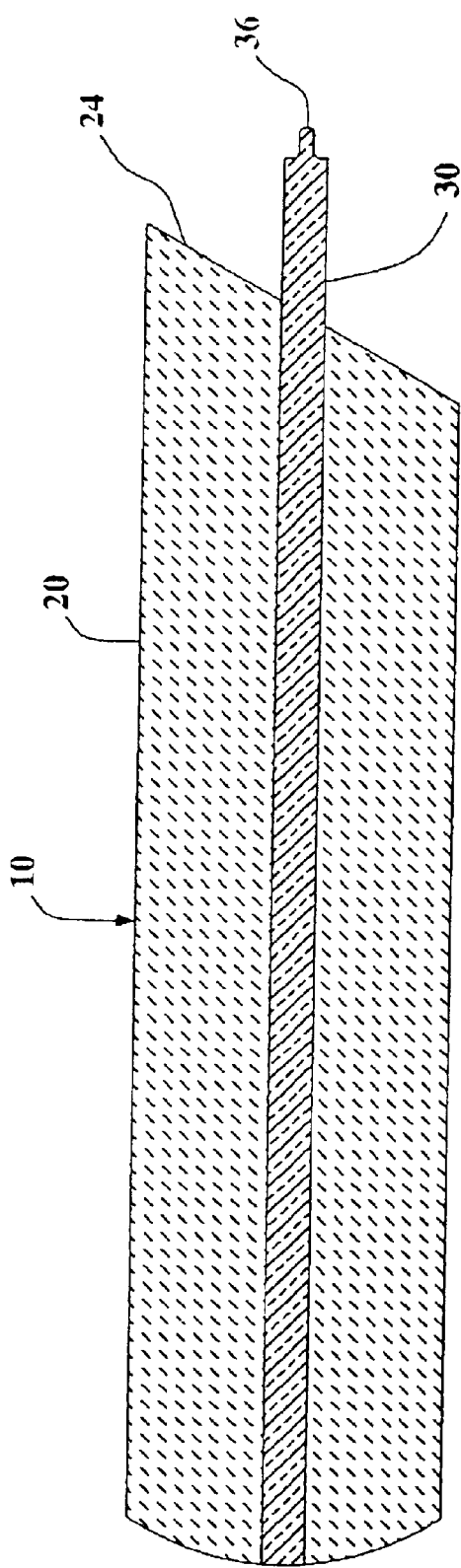
FIG. 6 is a cross-sectional view of another embodiment of the device having a lens formed on an end of the optical fiber.

In another variation of the invention, FIG. 6 is a cross-sectional view of the device 10 of FIGS. 1–3 having a lens 36 formed on the second end of the optical fiber 30. The lens can be formed by selectively applying the energy of a laser beam to the tip of the optical fiber so as to shape the end. Such a lens 36 eliminates the need for a separate focusing element 100 as shown and described in FIG. 5.

Figure 7:
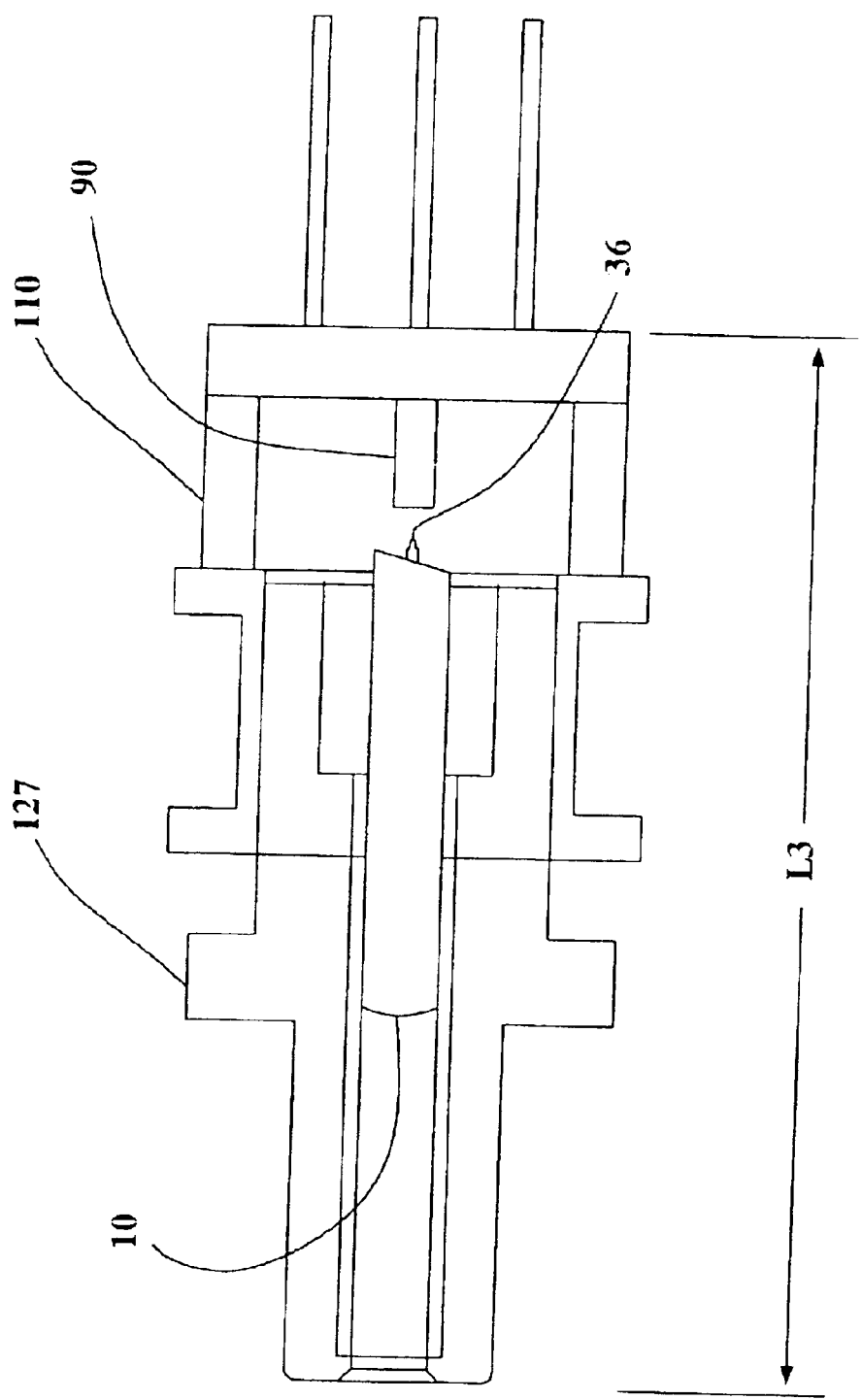
FIG. 7 is a cross-sectional view of the device of FIG. 6 mounted in a housing along with an optoelectronic device.

FIG. 7 is a partial cross-sectional view of the device 10 as shown in FIG. 6, employed in an assembly 110 having an optoelectronic device 90. The optoelectronic device 90 and the device 10 (including the stub 20 and optical fiber 30) are attached to the housing 127. Since the lens 36 is formed on the end of the optical fiber, the focusing element 100 as shown in FIG. 5 is not required. Thus, the can or lid 94 of the assembly 80 of FIG. 5 can be eliminated. The removal of the can 94 provides for a more compact assembly. The overall length L3 of the assembly 110 is less than the overall length L2 of the assembly 80 as shown in FIG. 5. The remaining structure of the assembly 110 allows for hermeticity.

Figure 8:
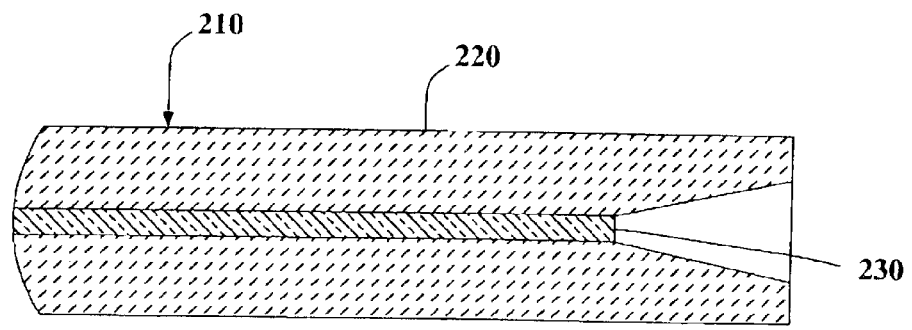
FIG. 8 is a cross-sectional view of another embodiment of the device having the optical fiber housed within the stub.

In yet another variation of the invention, FIG. 8 is a cross-sectional view of the device 210 having an optical fiber 230 housed within a stub 220. The device 210 is similar to the device 50 of FIG. 4. Unlike the device 50 of FIG. 4, the device 210 of FIG. 8 has one end of the stub 220 terminated in a position which is substantially at an angle of ninety degrees relative to the length of the stub 220. Having the optical fiber 230 housed within the stub 220 which results in a portion of the stub 220 extending beyond the optical fiber 230 provides for a mechanically robust and rigid design. Furthermore, the device 210 allows for the adjustment of the end of the optical fiber 230 relative to the optoelectronic device or relative to a separate focusing element such as a ball lens if one is so provided in the assembly. Such an adjustment is provided in the manufacture of the device 210.

During manufacture, the device 210 is constructed by selecting a stub 220 having an appropriate aperture. An optical fiber 230 is inserted into the aperture so that the optical fiber 230 extends past both ends of the stub 220. The optical fiber 230 extending past the end of the stub 220 having the conically shaped aperture is either cleaved or has been pre-cleaved prior to insertion and also that end of the optical fiber 230 can be lensed or can pre-lensed if a lens is so desired. Then an adhesive is placed on the optical fiber 230 near the portion of the optical fiber extending past the conically shaped aperture of the stub 220. The optical fiber 230 is then moved relative to the stub 220 so that the end of the optical fiber 230 is situated near the apex of the conical portion of the aperture of the stub 220. Any amount of the optical fiber 230 extending beyond the other end of the stub 220 is polished flush with the surface of the stub 220 as described in the previous embodiments. Depending on the application, the position of the end of the optical fiber 230 near the conically shaped aperture of the stub 220 can be controlled and prescribed relative to the end of the stub 230 located near the conically shaped aperture. Therefore, the end of the optical fiber 230 near the conically shaped aperture may be flush with the apex of the cone or it may extend into the conical region. Thus, the mechanical length of the stub and the length of the optical fiber can be separated during assembly of the device 210. The conically shaped portion of the aperture is sized so as to prevent light energy emanating from the end of the optical fiber 230, or entering it, from impinging on the surface of the conically shaped portion of the aperture.

Obviously, numerous modifications and variations of the present invention are possible in light of the above teachings. It is therefore to be understood that within the scope of the appended claims, the invention may be practiced otherwise than as specifically described herein.

What is claimed is:

1. A device comprising:
   a stub having an aperture, the stub having a first end and a second end, the first end of the stub separated from the second end of the stub by a first stub length, the aperture having a conical portion adjacent the second end of the stub, the conical portion of the aperture having an apex; and an optical fiber mounted in the aperture of the stub, the optical fiber having a first end and a second end, and wherein the first end of the optical fiber is polished so as to be substantially flush with the first end of the stub, and wherein the second end of the optical fiber is terminated at a predetermined position so as to provide for a predetermined length of the optical fiber measured from the first end of the optical fiber to the second end of the optical fiber, the second end of the optical fiber substantially adjacent to the apex of the conical portion of the aperture of the stub, and wherein the first stub length is greater than the predetermined length of the optical fiber, and wherein the conical portion of the aperture of the stub is sized so as to prevent light energy emanating from the second end of the optical fiber from impinging on a surface of the conical portion of the aperture of the stub.

2. A device comprising:
   a stub having an aperture, the stub having a first end and a second end, the first end of the stub separated from the second end of the stub by a first stub length, the aperture having a conical portion adjacent the second end of the stub, the conical portion of the aperture having an apex;

an adhesive material; and an optical fiber attached to the aperture of the stub with the adhesive material, the optical fiber having a first end and a second end, and wherein the first end of the optical fiber is polished so as to be substantially flush with the first end of the stub, and wherein the second end of the optical fiber is cleaved at a predetermined position so as to provide for a predetermined length of the optical fiber measured from the first end of the optical fiber to the second end of the optical fiber, the second end of the optical fiber substantially adjacent to the apex of the conical portion of the aperture of the stub, and wherein the first stub length is greater than the predetermined length of the optical fiber, and wherein the conical portion of the aperture of the stub is sized so as to prevent light energy emanating from the second end of the optical fiber from impinging on a surface of the conical portion of the aperture of the stub.

3. A device comprising:
   a stub having an aperture, the stub having a first end and a second end, the first end of the stub separated from the second end of the stub by a first stub length, the aperture having a conical portion adjacent the second end of the stub, the conical portion of the aperture having an apex;

an adhesive material; and an optical fiber attached to the aperture of the stub with the adhesive material, the optical fiber having a first end and a second end, and wherein the first end of the optical fiber is polished so as to be substantially flush with the first end of the stub, and wherein the second end of the optical fiber is cleaved at a predetermined position so as to provide for a predetermined length of the optical fiber measured from the first end of the optical fiber to the second end of the optical fiber, the second end of the optical fiber substantially adjacent to the apex of the conical portion of the aperture of the stub, and wherein the first stub length is greater than the predetermined length of the optical fiber, and wherein the conical portion of the aperture of the stub is sized so as to prevent light energy emanating from the second end of the optical fiber from impinging on a surface of the conical portion of the aperture of the stub, and wherein the second end of the optical fiber is cleaved by way of laser ablation.

4. A device comprising:

a stub having an aperture, the stub having a first end and a second end, the first end of the stub separated from the second end of the stub by a first stub length, the aperture having a conical portion adjacent the second end of the stub, the conical portion of the aperture having an apex;

an adhesive material; and an optical fiber attached to the aperture of the stub with the adhesive material, the optical fiber having a first end and a second end, and wherein the first end of the optical fiber is polished so as to be substantially flush with the first end of the stub, and wherein the second end of the optical fiber is cleaved at a predetermined position so as to provide for a predetermined length of the optical fiber measured from the first end of the optical fiber to the second end of the optical fiber, the second end of the optical fiber substantially adjacent to the apex of the conical portion of the aperture of the stub, and wherein the first stub length is greater than the predetermined length of the optical fiber, and wherein the conical portion of the aperture of the stub is sized so as to prevent light energy emanating from the second end of the optical fiber from impinging on a surface of the conical portion of the aperture of the stub, and wherein the second end of the optical fiber is cleaved by way of a mechanical process.

5. A device according to claim 4 wherein the second end of the optical fiber is cleaved at a predetermined angle.

6. A device according to claim 5 wherein the optical fiber is made of a glass material.

7. A device according to claim 6 wherein the stub is made of a ceramic material.

* * * * *